United States Patent

O'Shea et al.

[15] 3,676,427
[45] July 11, 1972

[54] PROCESS FOR THE MANUFACTURE OF THE DISODIUM SALT OF ALPHA-CARBOXYBENZYLPENICILLIN

[72] Inventors: Daniel P. O'Shea, Groton; Susumu Nakanishi, East Lyme, both of Conn.

[73] Assignee: Pfizer Inc., New York, N.Y.

[22] Filed: Jan. 26, 1971

[21] Appl. No.: 109,934

[52] U.S. Cl. .................................................. 260/239.1
[51] Int. Cl. .................................. C07d 99/16, C07d 99/18
[58] Field of Search ............................................. 260/239.1

[56] References Cited

UNITED STATES PATENTS

| | | | |
|---|---|---|---|
| 3,142,673 | 7/1964 | Hobbs | 260/239.1 |
| 3,282,926 | 11/1966 | Brain et al. | 260/239.1 |

*Primary Examiner*—Nicholas S. Rizzo
*Attorney*—Connolly and Hutz

[57] ABSTRACT

An improved process for the manufacture of the crystalline disodium salt of $\alpha$-carboxybenzylpenicillin from solutions of disodium $\alpha$-carboxybenzylpenicillin.

5 Claims, No Drawings

PROCESS FOR THE MANUFACTURE OF THE DISODIUM SALT OF ALPHA-CARBOXYBENZYLPENICILLIN

BACKGROUND OF THE INVENTION

This invention relates to a novel, convenient and economic process for producing salts of α-carboxybenzylpenicillin. More particularly, it relates to the production of the crystalline disodium salt of α-carboxybenzylpenicillin.

The valuable broad spectrum penicillin, α-carboxybenzylpenicillin, is described in U.S. Pat. No. 3,142,673 and in British Pat. No. 1,004,670 along with the preparation of various salts of this valuable penicillin, including the disodium salt. However, the disodium salt as produced by the procedures of these references is amorphous rather then crystalline.

A number of factors render difficult the formation of crystalline alkali metal α-carboxybenzylpenicillin salts. In particular, the penicillin itself is highly polar and is susceptible to degradation, particularly at elevated temperatures and at pH about 9 or below 4, forming decomposition products such as benzyl penicillin, penicilloic acid and penillic acid. Further, the alkali metal salts tend to be quite hygroscopic.

An amorphous salt is, in general, less desirable than is a crystalline form thereof from a preparative, storage and use standpoint. The physical characteristics of an amorphous salt, such as ease of handling, dispersibility in solution, and color of the salt, are generally inferior to those of a crystalline form of the same salt. Additionally, amorphous forms of a salt are frequently more hygroscopic than is a crystalline form of said salt.

For pharmaceutical usage, the above-mentioned disadvantages of an amorphous salt, relative to those of a crystalline form of the salt, are especially objectionable. The formation of acceptable dosage forms and the various pharmaceutically elegant preparations required and demanded by the medical and pharmaceutical professions is rendered difficult with an amorphous salt.

In the case of α-carboxybenzylpenicillin, the disadvantages of amorphous forms of its disodium salt are of particular concern since it is an extremely effective broad spectrum penicillin. The preparation of crystalline disodium α-carboxybenzylpenicillin is, therefore, of great importance to the pharmaceutical and medical professions.

SUMMARY OF THE INVENTION

It has now been found that stable, crystalline disodium α-carboxybenzylpenicillin can be conveniently prepared by a process which comprises the steps of: combining an aqueous solution of about 10 to 50 percent by weight of disodium α-carboxybenzylpenicillin with n-propyl alcohol; removing the solvents by co-distillation with n-propyl alcohol; and drying the resulting crystalline disodium α-carboxybenzypenicillin.

The process utilizes readily available equipment and is characterized by ease of manipulation, overall economy, and high quality of the crystalline salt. The stable crystalline salt of the present invention is useful in the same dosage forms and amounts for the same purposes as are the amorphous prior art products, but does not share the above-mentioned shortcomings of the amorphous product.

DETAILED DESCRIPTION OF THE INVENTION

The novel process of this invention can be used to prepare the crystalline disodium salt of α-carboxybenzylpenicillin from aqueous solutions of disodium α-carboxybenzylpenicillin. The penicillin concentration of said aqueous solution is from about 10 to 50 percent w/w, with the preferred amount being from about 20 to 40 percent w/w.

The aforementioned disodium α-carboxybenzylpenicillin solution may be prepared in situ by suspending monosodium α-carboxybenzylpenicillin in water at a temperature of from about −5° to 25° C., the preferred temperature being from about 0° to 10° C., and adjusting the pH from about 6.0 to 7.0 with a basic compound such as sodium hydroxide, sodium bicarbonate or sodium carbonate. The preferred base however is sodium carbonate with a final pH adjustment made with sodium hydroxide.

It is also possible to obtain a solution of sodium α-carboxybenzylpenicillin by the hydrolysis of the N-ethylpiperidine salt of phenyl α-carboxybenzyl-penicillin. Standard hydrolysis techniques are employed and the hydrolysis product is extracted into an organic solvent such as n-butanol, ethyl acetate, or butyl acetate under acid conditions. The preferred organic solvent, however, is butyl acetate. The free α-carboxybenzylpenicillin is then extracted from the organic solvent into water containing a stoichiometric proportion of sodium hydroxide, sodium bicarbonate or sodium carbonate, yielding an aqueous solution of disodium α-carboxybenzylpenicillin.

The concentrated aqueous solution of disodium α-carboxybenzylpenicillin obtained by the methods previously described may be carbon treated and sterile-filtered if desired. The solution is then diluted with n-propyl alcohol to a total water content of from about 10 to 40 percent by volume. The preferred diluent is n-propyl alcohol with the preferred water content being from about 15 to 30 percent by volume. The addition of the diluent preferably is carried out at a temperature of from about −5° to 5° C. The mixture is then co-distilled at temperatures of from about 0° to 20° C., the preferred range being from about 0° to 10° C., at low pressure, e.g., at about 1 to 10 mm of mercury, until the oil phase crystallizes, at about a 10 percent water content.

This mixture is further distilled with the constant addition of dry n-propyl alcohol to yield a n-propyl alcohol slurry of disodium α-carboxybenzyl-penicillin containing less than 0.5 percent water. The co-distillation of n-propyl alcohol-water is carried out at from about 0° to 25° C., preferably at a pressure of about 5 to 15 mm of mercury. The slurry is then filtered and the resultant solid product is vacuum dried, yielding crystalline disodium α-carboxybenzylpenicillin.

This procedure may be readily adopted to allow for a continuous process which will allow continuous dilution with n-propanol and evaporation through precipitation to a dry crystalline product.

EXAMPLE I

To a 5 gallon battery jar submerged in a methanol-ice bath is added 6,000 ml. of distilled water. When the temperature of the distilled water reaches 0°–5° C. the intermittent addition of a total of 5 kg. of monosodium α-carboxy-benzylpenicillin and 1,080 ml. of 6N sodium carbonate is begun. A final pH adjustment to pH 6.2–6.3 is then made with about 1,000 ml. of 2N NaOH. The temperature is maintained at −2° to 2° C. throughout this adjustment. Activated carbon, 150 gm., is added and the mixture is agitated for about one-half hour at −2° to 2° C. Diatomaceous earth filter aid, 75 gm, is added and the mixture is then filtered through a Buchner funnel previously coated with 75 gm. of a suitable diatomaceous earth filter and the filter cake is then washed with a 50:50 mixture of n-propanol and water. The combined filtrates are placed in a 20 gal. precipitation tank and n-propanol is added in a quantity to adjust the water content to 16 percent. This is also carried out at 0° to 5° C. and under partial vacuum. At this water concentration a two phase mixture results.

The above mixture is dehydrated by distillation at 5°–7° C. and 5–7 mm of Hg, causing concentration of an oil phase with decreasing water content until precipitation. At 10 percent water content the oil phase crystallizes. The slurry is further dehydrated to less than 0.5 percent water by continued stripping at 15° C. and 15 mm of Hg. with addition of n-propanol (83 liters) at approximately the same rate as the boil-off rate. The resultant solid is filtered and vacuum dried at 50° C. and 5 mm. of Hg. for 16 hours, yielding crystalline disodium α-carboxybenzylpenicillin of very high quality.

EXAMPLE II

Boric acid (61.8 g.) and potassium chloride (74.56 g.) are dissolved in water and sufficient water added to the solution to bring the volume to two liters. A sufficient amount of 0.5 N sodium hydroxide is added to adjust the solution to pH 9.0. α-Carboxybenzylpenicillin phenyl ester N-ethylpiperidine salt is dissolved in this buffer solution and the mixture stirred at room temperature (25° C.) for 2.5 hours. The reaction mixture becomes more acidic as hydrolysis proceeds until, at the cessation of reaction, the mixture reaches pH 8.45. The solution contains crude di-sodium salt of α-carboxybenzyl-penicillin.

The reaction is cooled to 0°–10° C. and n-butanol (700 ml.) is added followed by sufficient 2 N HCl to acidify the mixture to pH 2.4. The n-butanol extract is then separated and treated with sufficient 0.5 N sodium hydroxide to adjust to pH 6.2–6.3. The aqueous layer containing disodium α-carboxybenzylpenicillin is then processed following the procedure of Example I to produce crystalline disodium α-carboxybenzylpenicillin.

EXAMPLE III

α-Carboxybenzylpenicillin phenyl ester N-ethyl piperidine salt, 80 gm. is dissolved in 1,000 ml. of $H_2O$. The solution is cooled to 10° C., and the pH is maintained at 9.5–9.6 for 6 hours with about 38 ml. of 5 N NaOH. The temperature varies between 9°–11° C. throughout the hydrolysis. The resulting solution is adjusted to a neutral pH with $H_2SO_4$ and 4.8 gms. of activated carbon added. After a one-half hour stirring period at 0°–5° C. the carbon is filtered off. The resulting 1100 ml. of filtrate is layered with 550 ml. of butyl acetate and while maintaining 0°–5° C. the mixture is adjusted to pH 2.5 with $H_2SO_4$. The layers are separated and the resulting 568 ml. of butyl acetate extract is layered with 25 ml. of water and the pH adjusted to 6.1 with an aqueous sodium carbonate solution. Further water was added to bring the concentration of aqueous layer to 35 percent (w/v) product. After separation of the mixture, 1.2 gms. of activated carbon was added to the resulting 113 ml. aqueous phase. After stirring for 1/2 hours at 0°–5° C. the carbon was filtered off.

337 ml. of dry n-propanol was added to the aqueous phase and distillation is commensed. The temperature is maintained at 3°–5° C. (8 mm of Hg) until precipitation occurs 2 hours later. The co-distillation is continued with the addition of 1,000 ml. of dry n-propanol at 15°–25° C. for 2 additional hours. The slurry is filtered and the wet cake is vacuum dried at 50° C. for 16 hours. 44.1 gm. of high quality disodium salt of α-carboxybenzylpenicillin resulted.

EXAMPLE IV

The procedure of Example III is followed but with the substitution of ethyl acetate for butyl acetate. Comparable results are obtained.

EXAMPLE V

A comparative decomposition study of the crystalline disodium α-carboxy-benzylpenicillin product of this process and an amorphous salt is carried out at 50° C. with the following results obtained:

| Storage Time (Days) | Crystalline Disodium α-Carboxybenzylpenicillin | |
|---|---|---|
| | % Penicilloic Acid | % Increase |
| 0 | 5.23 | 0 |
| 4 | 5.55 | 0.32 |
| 11 | 6.32 | 1.09 |
| 18 | 6.69 | 1.46 |
| 28 | 7.21 | 1.98 |
| 39 | 7.97 | 2.74 |

| Storage Time (Days) | Amorphous Disodium α-Carboxybenzylpenicillin | |
|---|---|---|
| | % Penicilloic Acid | % Increase |
| 0 | 9.79 | 0 |
| 3 | 9.86 | 0.07 |
| 7 | 11.73 | 1.94 |
| 13 | 12.10 | 2.31 |
| 31 | 14.77 | 3.98 |

The above clearly indicates the superior characteristics of this crystalline product.

A comparative moisture pickup study is carried out at 50 percent relative humidity with the results indicating the superiority of the crystalline disodium α-carboxybenzylpenicillin product.

| Type of Disodium α-carboxybenzylpenicillin | % Moisture Pickup at 50% Relative Humidity Time (Days) | | | |
|---|---|---|---|---|
| | 2 | 3 | 6 | 10 |
| *Amorphous | 8.79 | 10.8 | 13.24 | 14.5 |
| +Crystalline | 4.03 | 4.48 | 4.76 | 4.65 |

\* As lyophilized in vial
\+ As dried in 6 cm. weighing dish

What is claimed is:

1. A process for the manufacture of crystalline disodium α-carboxybenzyl-penicillin which comprises the steps of combining an aqueous solution containing from about 10 to 50 percent by weight of disodium α-carboxybenzylpenicillin with n-propyl alcohol; removing the major portion of the solvents by co-distillation with n-propyl alcohol; and separating and drying the resulting crystalline disodium α-carboxybenzyl-penicillin.

2. The process of claim 1 wherein said aqueous disodium α-carboxybenzyl-penicillin solution is formed in situ by suspending monosodium carbenicillin in water, and adjusting the pH to from about 6.0 to 7.0 with a basic compound selected from the group consisting of sodium hydroxide, sodium bicarbonate, and sodium carbonate.

3. The process of claim 1 wherein said disodium α-carboxybenzylpenicillin solution is formed in situ by hydrolyzing the N-ethylpiperidine salt of phenyl α-carboxybenzylpenicillin to yield free carbenicillin acid; extracting said free acid with an extracting solvent selected from the group consisting of n-butanol, ethyl acetate and butyl acetate; and adding an aqueous solution containing a basic compound selected from the group consisting of sodium hydroxide, sodium bicarbonate and sodium carbonate.

4. The process of claim 1 wherein said co-distillation of water with n-propyl alcohol is carried out until the water content of the residue is less than 0.5 percent w/w.

5. The process of claim 3 wherein said extracting solvent is butyl acetate.

\* \* \* \* \*